US012638064B2

(12) United States Patent
     Botterbusch et al.

(10) Patent No.:     US 12,638,064 B2
(45) Date of Patent:        May 26, 2026

(54) SOFT SHACKLE WITH LOCKING MECHANISM

(71) Applicant: SAMSON ROPE TECHNOLOGIES, INC., Ferndale, WA (US)

(72) Inventors: Michael Botterbusch, Bellingham, WA (US); Ross Anderton, Bellingham, WA (US); Anthony Kovich, Bellingham, WA (US); Danielle Stenvers, Ferndale, WA (US); John Hughson, Bellingham, WA (US); Kenneth Britt, Ferndale, WA (US); Dustin Heins, Bellingham, WA (US); DeAnna L. Hanssen, Bellingham, WA (US); Micah James Donovan, Ferndale, WA (US); Richard Johnson, Sedro Woolley, WA (US); Anuvedika Murti, Bellingham, WA (US); Chad Hislop, Bellingham, WA (US); James R. Plaia, Blaine, WA (US)

(73) Assignee: SAMSON ROPE TECHNOLOGIES, INC., Ferndale, WA (US)

( * ) Notice: Subject to any disclaimer, the term of this patent is extended or adjusted under 35 U.S.C. 154(b) by 132 days.

(21) Appl. No.: 18/757,771

(22) Filed: Jun. 28, 2024

(65) Prior Publication Data

US 2025/0084912 A1      Mar. 13, 2025

Related U.S. Application Data

(60) Provisional application No. 63/582,282, filed on Sep. 13, 2023.

(51) Int. Cl.
     *F16G 11/14*              (2006.01)

(52) U.S. Cl.
     CPC ................................... *F16G 11/14* (2013.01)

(58) Field of Classification Search
     CPC . F16G 11/14; F16G 15/04; B66C 1/12; D07B
                                                                1/18
     See application file for complete search history.

(56)                    References Cited

U.S. PATENT DOCUMENTS 6,684,805  B2      2/2004  Curchod
     D657,234  S  *     4/2012  Herman ......................... D8/382
     D849,521  S  *     5/2019  Worswick ...................... D8/382
                          (Continued)

FOREIGN PATENT DOCUMENTS

AU        2021103092 A4      8/2021
     CN        213653041          7/2021
                          (Continued)

OTHER PUBLICATIONS

350t Lankonect soft shackles with extras—LinkedIn Post; downloaded Sep. 26, 2024.

*Primary Examiner* — David M Upchurch
(74) *Attorney, Agent, or Firm* — McNees Wallace & Nurick LLC

(57)                     ABSTRACT

A soft shackle is provided that incorporates a locking mechanism that prevents or limits travel of a loop from passing back over a shackle knot caused by slippage when not under tension of a load. The locking mechanism controls the loop's ability to expand in size, such as through a positive locking force or establishes a safety factor with respect to the size of the loop needed to slip over the knot, or both.

13 Claims, 16 Drawing Sheets

(56)         References Cited

U.S. PATENT DOCUMENTS

| 2017/0108081 A1* | 4/2017 | Laurant | F16G 11/046 |
|---|---|---|---|
| 2017/0334533 A1* | 11/2017 | Herman | B63H 9/10 |
| 2019/0126698 A1* | 5/2019 | Russell | B60D 1/187 |
| 2021/0094159 A1* | 4/2021 | Veka | F16G 11/146 |
| 2021/0215230 A1* | 7/2021 | Howard | F16G 11/14 |
| 2022/0252136 A1* | 8/2022 | Herman, Jr. | F16G 11/14 |
| 2022/0306435 A1* | 9/2022 | Cole | F16H 55/36 |
| 2022/0307196 A1* | 9/2022 | Nicholson | F16G 15/06 |
| 2023/0271465 A1* | 8/2023 | Handbury | B60D 1/187 |
| | | | 29/428 |
| 2023/0372761 A1* | 11/2023 | Patrick | A63B 21/4009 |
| 2024/0344593 A1* | 10/2024 | Nicholson | F16G 15/06 |

FOREIGN PATENT DOCUMENTS

| CN | 221145171 | | 6/2024 |
|---|---|---|---|
| EP | 2955548 | A1 | 12/2015 |
| WO | 2016073974 | A1 | 5/2016 |
| WO | 2021142268 | A1 | 7/2021 |

* cited by examiner

120

300

360

380

370

390

SOFT SHACKLE WITH LOCKING MECHANISM

RELATED APPLICATIONS

This application claims the benefit of, and priority to, U.S. App. No. 63/582,282 filed Sep. 13, 2023 which is hereby incorporated by reference in its entirety.

FIELD OF DISCLOSURE

This disclosure is directed to soft shackles and more particularly to soft shackles having a locking mechanism.

BACKGROUND

Soft shackles refer to quick release connecting links made from rope that are used in a wide variety of rigging, towing and other conjoining systems in lieu of metal or other rigid materials and are found in a wide variety of applications, including marine and industrial crane uses.

Soft shackles include a knot at one end and an adjustable loop that can slide along the length of the soft shackle when not cinched into place, including being used to open or close the soft shackle around a load. The soft shackle can be used to secure a load under tension, with the size of the loop being adjustable in the absence of tension.

While the ability of the loop to change sizes is advantageous to be able to quickly open and close the shackle to secure a load, there may be times when the soft shackle and/or the adjustable loop itself are not under tension but connection to the load is still desired. In such cases, slippage can occur resulting in expansion of the adjustable loop. In some scenarios, this may result in the adjustable loop becoming wide enough to slip over the stopping knot, resulting in a loss of the shackle eye. This, in turn, creates a possibility the soft shackle is no longer able to carry its load, resulting in a potential safety hazard, especially when the soft shackle is being used in lifting applications.

It would be desirable to provide a soft shackle that exhibits greater reliability to maintain its shackle conformation and reduce or eliminate slippage that results in unintended changes in loop size.

SUMMARY

Exemplary embodiments are directed to soft shackles that incorporate a locking mechanism to prevent or limit travel of the loop caused by slippage when not under tension. In some embodiments the locking mechanism controls the loop's ability to expand in size, such as through a positive locking force. In other embodiments, the locking mechanism establishes a safety factor with respect to the size of the loop needed to slip over the knot end. Other embodiments employ other manners of locking mechanism operation and any of which may be used individually or in combination with one or more other types of locking mechanism.

In one embodiment, a soft shackle rope link comprises a first end comprising a knot and having first and second rope legs extending therefrom toward a second end opposite the first end, the second end having a loop defined by the first rope leg passing through the second rope leg at a loop junction, the first and second rope legs being part of a same base rope, wherein the rope link is configured to have a shackle conformation defining a shackle eye when the knot is positioned through the loop and the loop is positioned adjacent a second end side of the knot; and further comprising a locking mechanism integrated with or permanently attached to the rope link, the locking mechanism establishing a maximum diameter of the loop that is less than a diameter of the knot. In certain embodiments, the loop is an adjustable diameter loop in which the first rope leg is movable with respect to the second rope leg to adjust the diameter of the adjustable diameter loop.

In another embodiment, a soft shackle rope link comprises a first end comprising a knot and having first and second rope legs extending therefrom toward a second end opposite the first end, the second end having an adjustable diameter loop defined by the first rope leg passing through the second rope leg at a loop junction, the first and second rope legs being part of a same base rope, wherein the first rope leg is movable with respect to the second rope leg to adjust the diameter of the adjustable diameter loop, wherein the rope link is configured to have a shackle conformation defining a shackle eye when the knot is positioned through the adjustable diameter loop and the loop is positioned adjacent a second end side of the knot; a locking mechanism to establish a maximum diameter of the adjustable diameter loop that is less than a diameter of the knot, the locking mechanism comprising a web permanently affixed to the adjustable diameter loop and adapted to be wrapped around and secure opposing sides of the adjustable diameter loop; and the rope link further comprising a chafe covering at least a portion of the first and second legs extending from the first end adjacent the knot to a predetermined location proximate the loop junction.

In still another embodiment, a soft shackle rope link comprises a first end comprising a knot and having first and second rope legs extending therefrom toward a second end opposite the first end, the second end having an adjustable diameter loop defined by the first rope leg passing through the second rope leg at a loop junction, the first and second rope legs being part of a same base rope, wherein the first rope leg is movable with respect to the second rope leg to adjust the diameter of the adjustable diameter loop, wherein the rope link is configured to have a shackle conformation defining a shackle eye when the knot is positioned through the adjustable diameter loop and the loop is positioned adjacent a second end side of the knot; and further comprising a locking mechanism having an element attached adjacent to, or integral with, the knot, the element defining a diameter that is at least 3.1 times greater than a diameter of the base rope.

In yet another embodiment, a soft shackle rope link comprises a first end comprising a knot and having first and second rope legs extending therefrom toward a second end opposite the first end, the second end having an adjustable diameter loop defined by the first rope leg passing through the second rope leg at a loop junction, the first and second rope legs being part of a same base rope, the first rope leg movable with respect to the second rope leg to adjust the diameter of the adjustable diameter loop. The rope link is configured to have a shackle conformation defining a shackle eye when the knot is positioned through the loop and the loop is positioned adjacent a second end side of the knot. The soft shackle rope link further comprises indicia applied to the base rope at a location configured to convey information of a potential failure of the soft shackle rope link.

Other features and advantages of the present invention will be apparent from the following more detailed description of exemplary embodiments, taken in conjunction with the accompanying drawings, which illustrate, by way of example, the principles of the invention.

DETAILED DESCRIPTION OF EXEMPLARY EMBODIMENTS

Exemplary embodiments are directed to soft shackles that incorporate a locking mechanism to prevent or limit travel of a loop caused by slippage when not under tension. The soft shackles described herein may be formed as an independent article for connection to other parts of a rope system or may be formed as an integrated member at the end of a longer rope.

Figure 1:
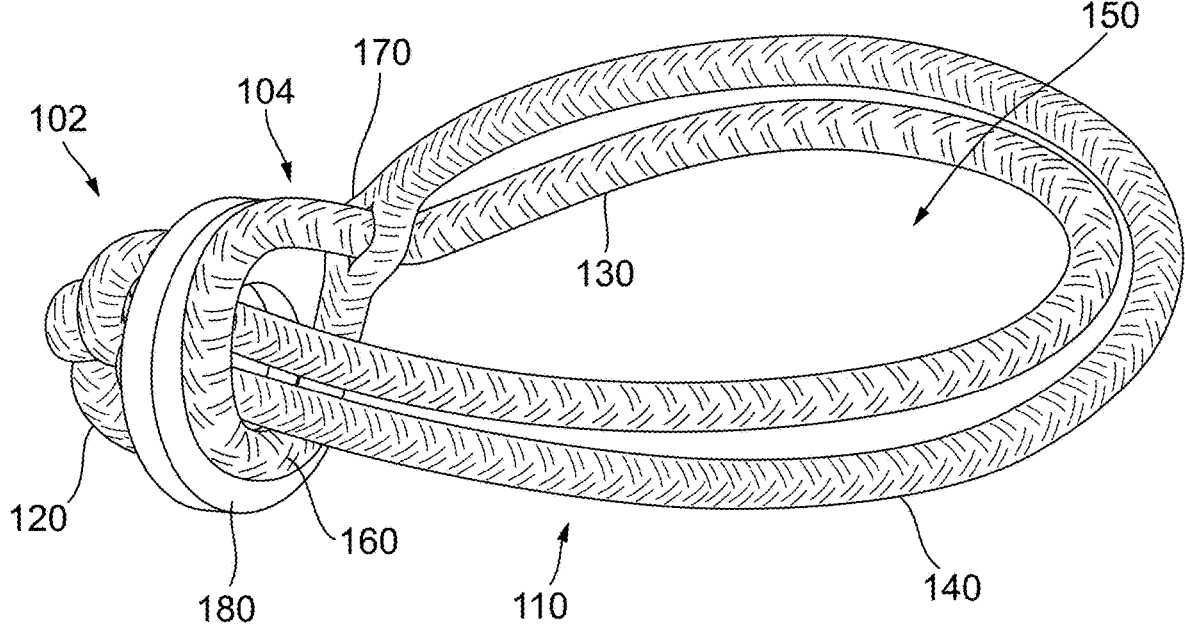
FIG. 1 illustrates a soft shackle in accordance with an exemplary embodiment.

Turning to FIG. 1, a soft shackle 100 is a rope link formed from a base rope 110. The terms soft shackle, rope link, and synthetic sling are used interchangeably herein, although soft shackle or synthethic sling may be used predominantly with respect to a closed, or shackle, configuration in which a shackle eye 150 is present. Exemplary embodiments typically make use of a single base rope in forming the soft shackle 100, although it will be appreciated that one or more additional base ropes may be employed if desired. It will further be appricated that soft shackles may be constructed having more than one shackle eye and/or more than one loop. Any suitable materials of construction may be used for the base rope(s) of the soft shackles in accordance with exemplary embodiments and are typically synthetic materials such as ultra-high-molecular-weight polyethylene (UHMWPE), poly(p-phenylene-2,6-benzobisoxazole) (PBO), aramids, polyamides, and combinations thereof, all by way of example.

The soft shackle has a first end 102 at which a knot 120 is formed, sometimes referred to as a stopping knot. The stopping knot 120 may be a monkey's fist knot, although other knot types might also be employed such as a right-hand knot. The stopping knot 120 may optionally be treated with a potting media after formation to more securely or even permanently fix the knot in place.

First and second rope legs 130, 140 extend away from the knot 120 toward a second end 104 opposite the first end 102. A loop, typically an adjustable diameter loop 160, is at the second end 104 and is defined by the first rope leg 130 passing through the second rope leg 140 at a loop junction 170. It will be appreciated, however, that the loop could be of a fixed size.

The first rope leg 130 is also referred to as the moving leg as it can move relative to the second (or non-moving) leg 140 to adjust the diameter of the adjustable diameter loop 160. The soft shackle 100 includes a shackle eye 150 when the knot 120 is passed through the adjustable diameter loop 160, with the loop 160 on the side of the knot closest the second end 104. The loop 160 is positioned adjacent the knot 120 and cinched.

The soft shackle includes a locking mechanism. In this embodiment, the locking mechanism is in the form of an element attached adjacent to, or integral with, the knot. The element of the locking mechanism preferably defines a diameter that is at least 3.1 times greater than a diameter of the base rope to provide more effective operation.

In some embodiments, it may be sufficient for the stopping knot 120 itself to be the integral element forming the locking mechanism. That is, the stopping knot 120 may be formed with a diameter that is sufficiently large relative to the adjustable loop 160 such that any expected loop expansion during slackening would not or could not grow to be larger than the stopping knot diameter.

Figure 6:
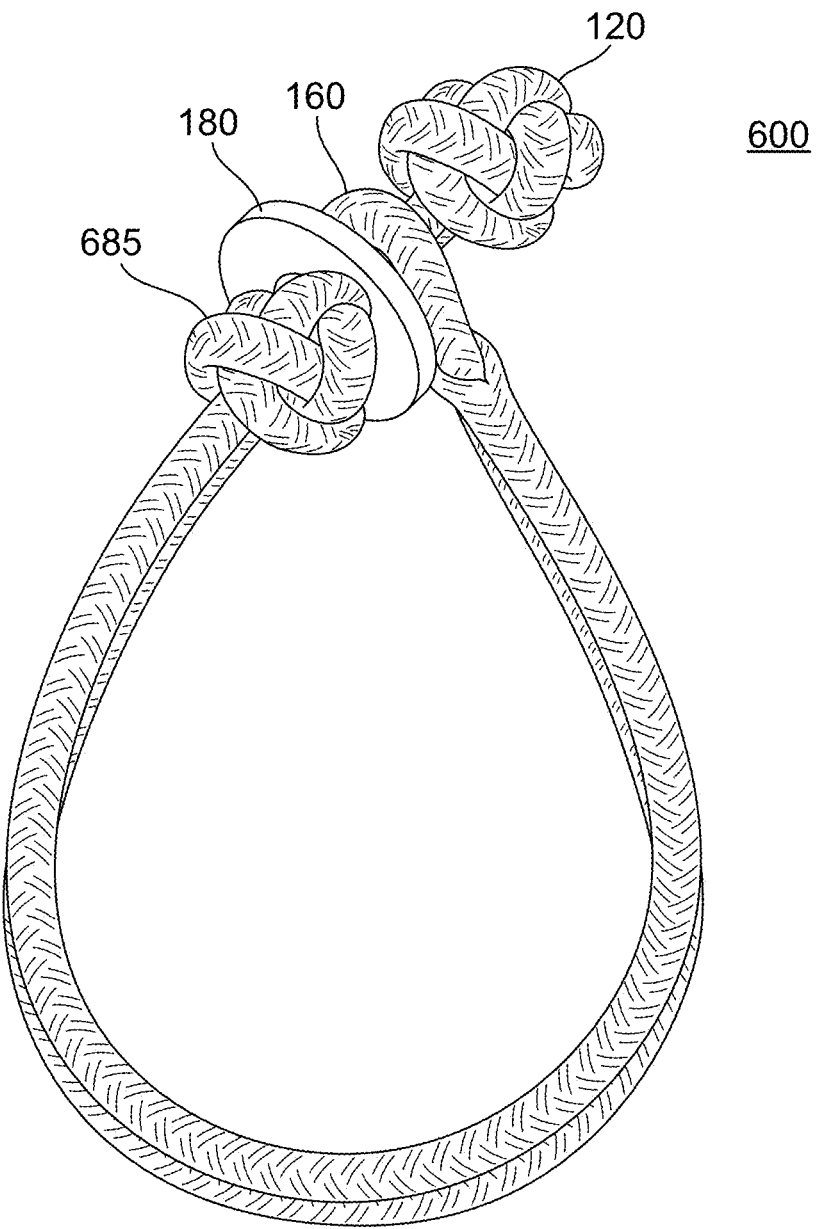
FIG. 6 illustrates a soft shackle in accordance with another exemplary embodiment.

As shown in FIG. 1, the locking mechanism is a mechanical hardware element 180 placed intermediate the stopping knot 120 and the adjustable loop 160. This can provide, for example, a flat for the loop 160 to react against or a groove (not shown) to lock the loop in place. The hardware element 180 may be a washer or similar, preferably rigid, element. The hardware element 180 has a larger diameter than the stopping knot. As a result, even if the adjustable loop 160 were to open upon a lack of tension, the loop 160 would have to open significantly wider than just the knot diameter, decreasing the likelihood of the shackle 100 coming open resulting in a loss of the shackle eye 150. The outer diameter of the hardware element 180 should be no smaller than the minimum diameter of the loop 160 when tightened/cinched in place under load and in some embodiments is at least 3.1 times greater than the diameter of the base rope 110 used to form the soft shackle. The hardware element 180 is disposed along the legs 130, 140 intermediate the loop 160 and knot 120. The hardware element 180 may be secured directly to the knot 120 or may be permitted to slide freely along the legs between the knot and the loop or between some shorter fixed distance, such as established by a second knot 685 (FIG. 6) or other fixed element on the opposite side of the hardware element 180 from the stopping knot 120. The second knot 685 may be smaller, larger, or the same size as the stopping knot 120.

Figure 4:
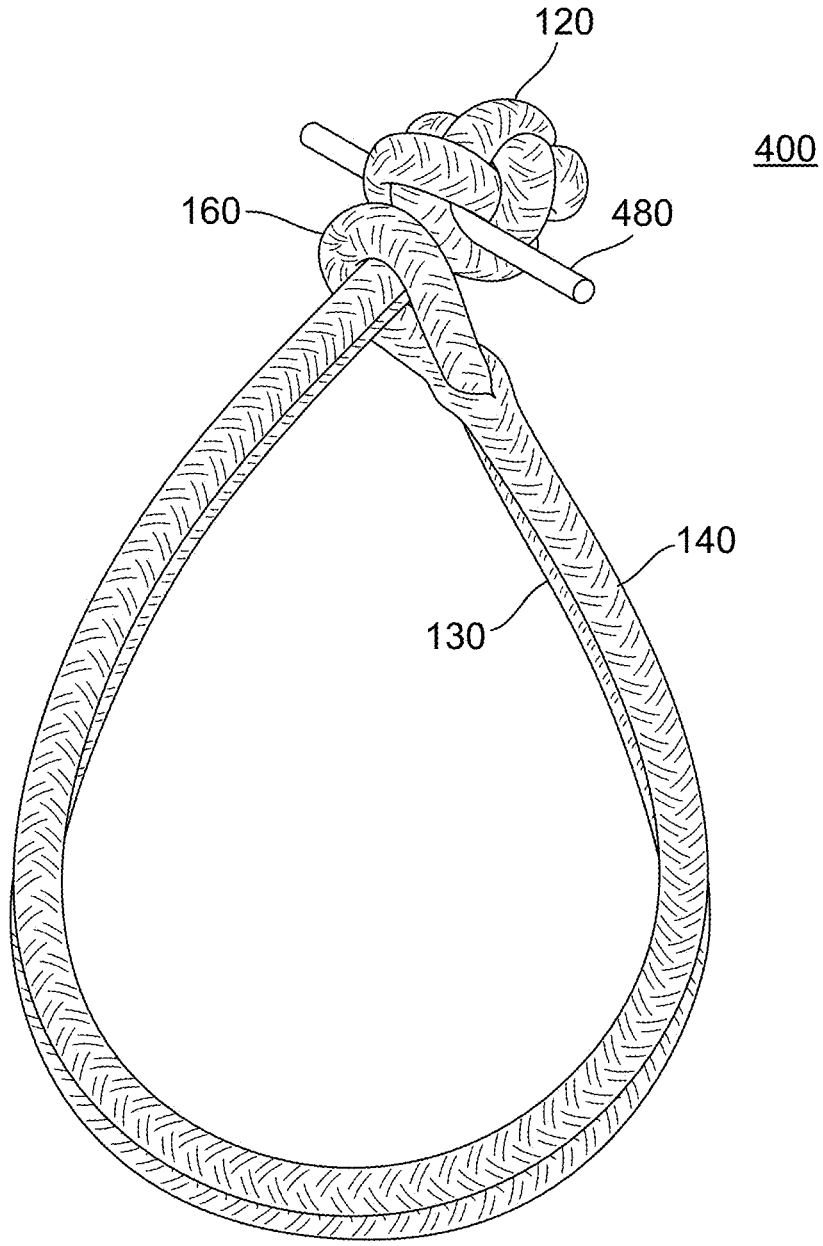
FIG. 4 illustrates a soft shackle in accordance with another exemplary embodiment.

It will be appreciated that other types of locking mechanisms may be employed to establish an exaggerated diameter to which the adjustable loop 160 must open to slip over the knot and that increases the safety factor by decreasing the likelihood the loop 160 would open unintentionally to a larger size. For example, with respect to FIG. 4, the locking mechanism is a pin 480 inserted through the stopping knot 120 to expand the effective diameter of the knot and thus the size to which the loop 160 must increase to be large enough to slip over the stopping knot 120. This effectively increases the size of the knot without the need for additional rope materials and thus resists passing the knot back out of the loop.

The pin 480 may be any suitable hardware article and constructed of any suitable rigid materials. The pin 480 may be removable or permanently positioned upon placement. If the pin 480 is to be permanently positioned in the stopping knot 120, it may be desirable to apply a potting medium or other cohesive coating to the knot 120 after the pin 480 has been inserted so that upon curing, the pin 480 is securely bound in position via the potting.

Embodiments may also employ a locking mechanism that establishes a maximum diameter of the adjustable loop when the soft shackle is not under tension that is less than the diameter of the knot and which in some embodiments is also integrated with or permanently attached to the soft shackle. The soft shackle is configured, for example, to establish a maximum distance of travel of the moving leg or even entirely lock the adjustable loop at or in its cinched position to prevent it from opening, even when not under tension. This may be accomplished by whipping both the moving and non-moving legs together behind the loop, such as adjacent the loop junction, using another smaller rope or fabric. Alternatively, a rigid hardware device may be secured instead at that location.

Figure 2:
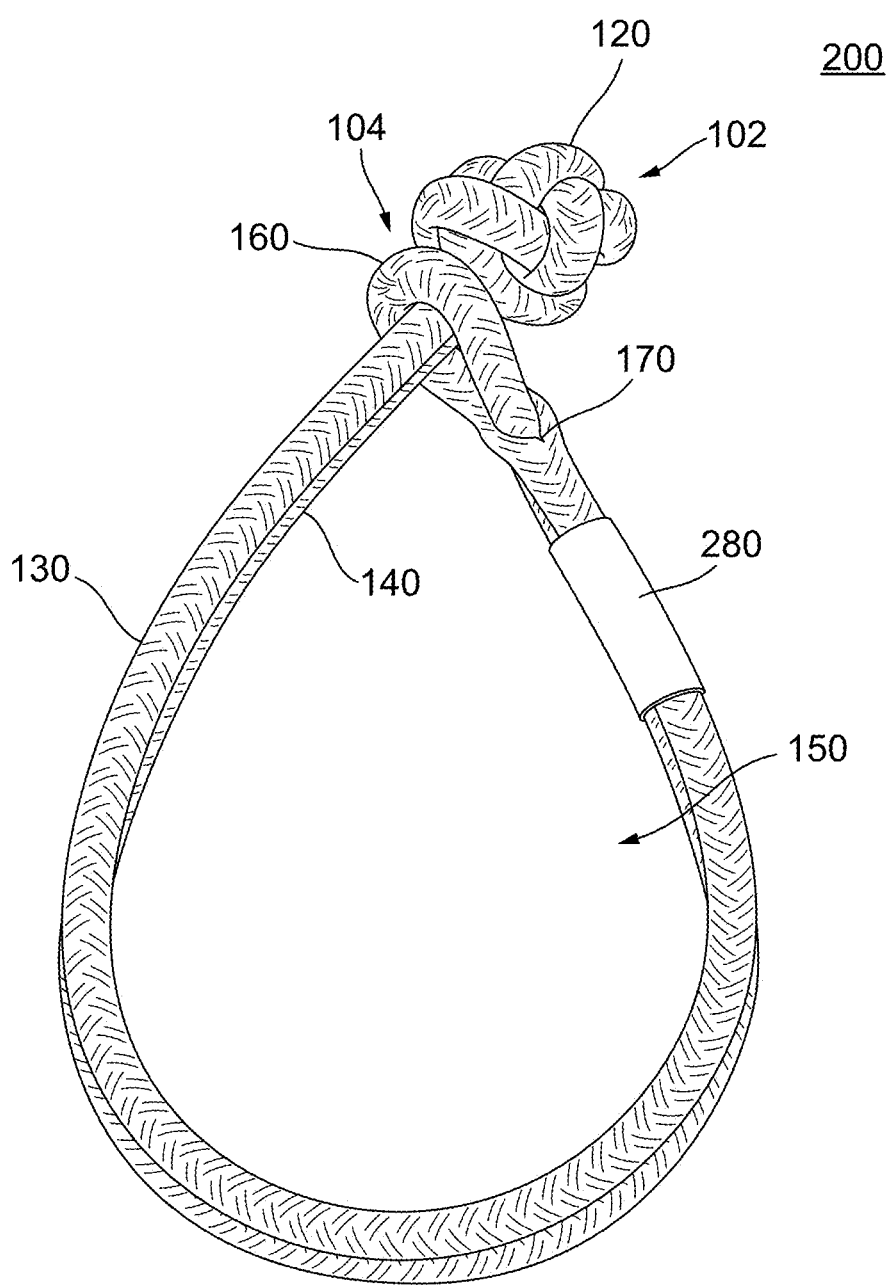
FIG. 2 illustrates a soft shackle in accordance with another exemplary embodiment.

Turning to FIG. 2, a soft shackle 200 includes a locking mechanism in the form of a tubular cover 280, such as a shrink wrap tube, surrounding the legs 130, 140. The shrink wrap tube is installed during initial formation of the soft shackle 200, positioned at the desired location behind the loop 160 and then heated to shrink the tube and bind the moving and non-moving legs 130, 140 together.

Still other additions may be made to the soft shackle loop adjustment area to ensure that the loop cannot become loose under tension without outside intervention. Such additions include locking cam hardware, a braided sleeve that can be slid over the loop junction, or a locking collar under the loop junction, all by way of example. The locking mechanism may also be formed from loose tails of the knot by passing them through the loop braid structure.

Figure 5:
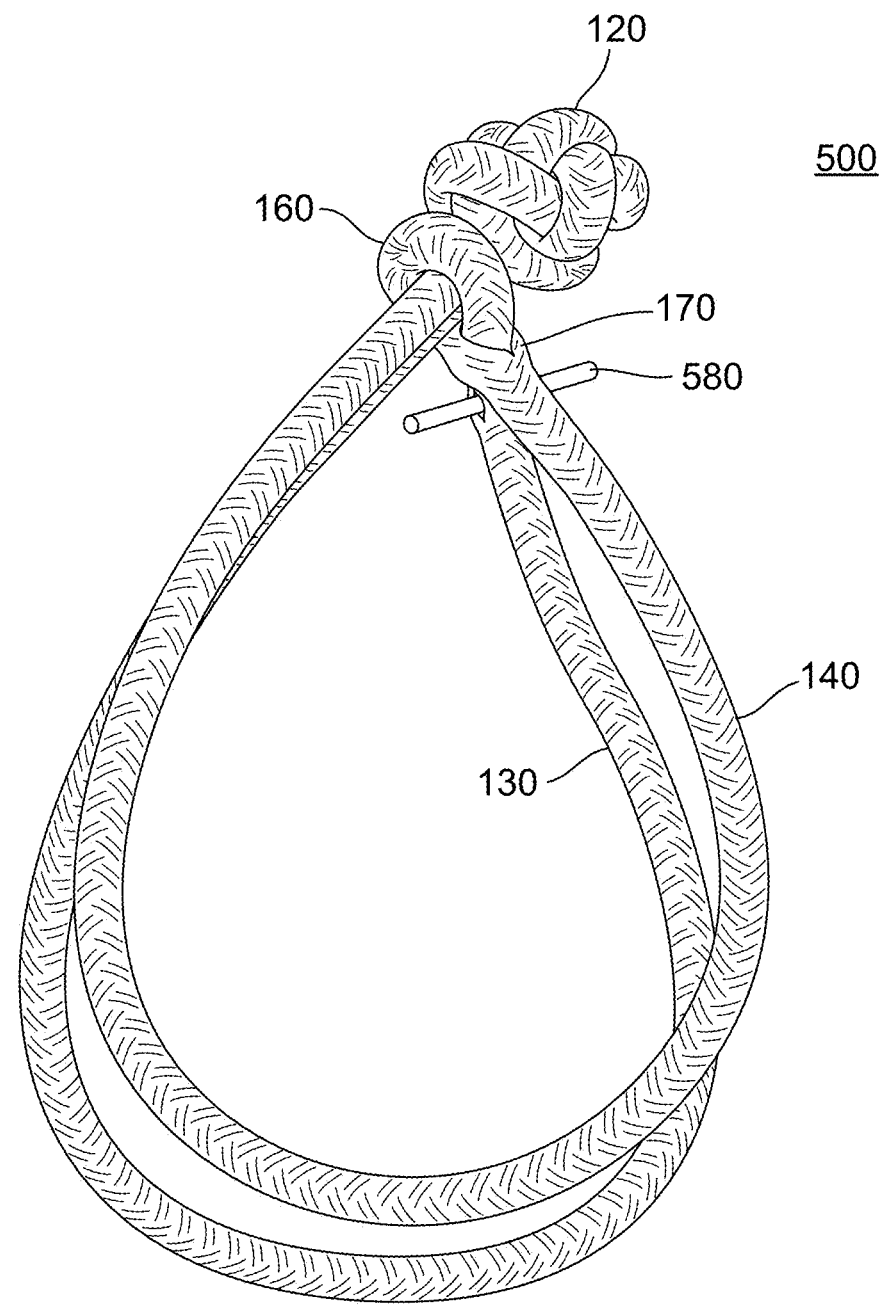
FIG. 5 illustrates a soft shackle in accordance with another exemplary embodiment.
Figure 7:
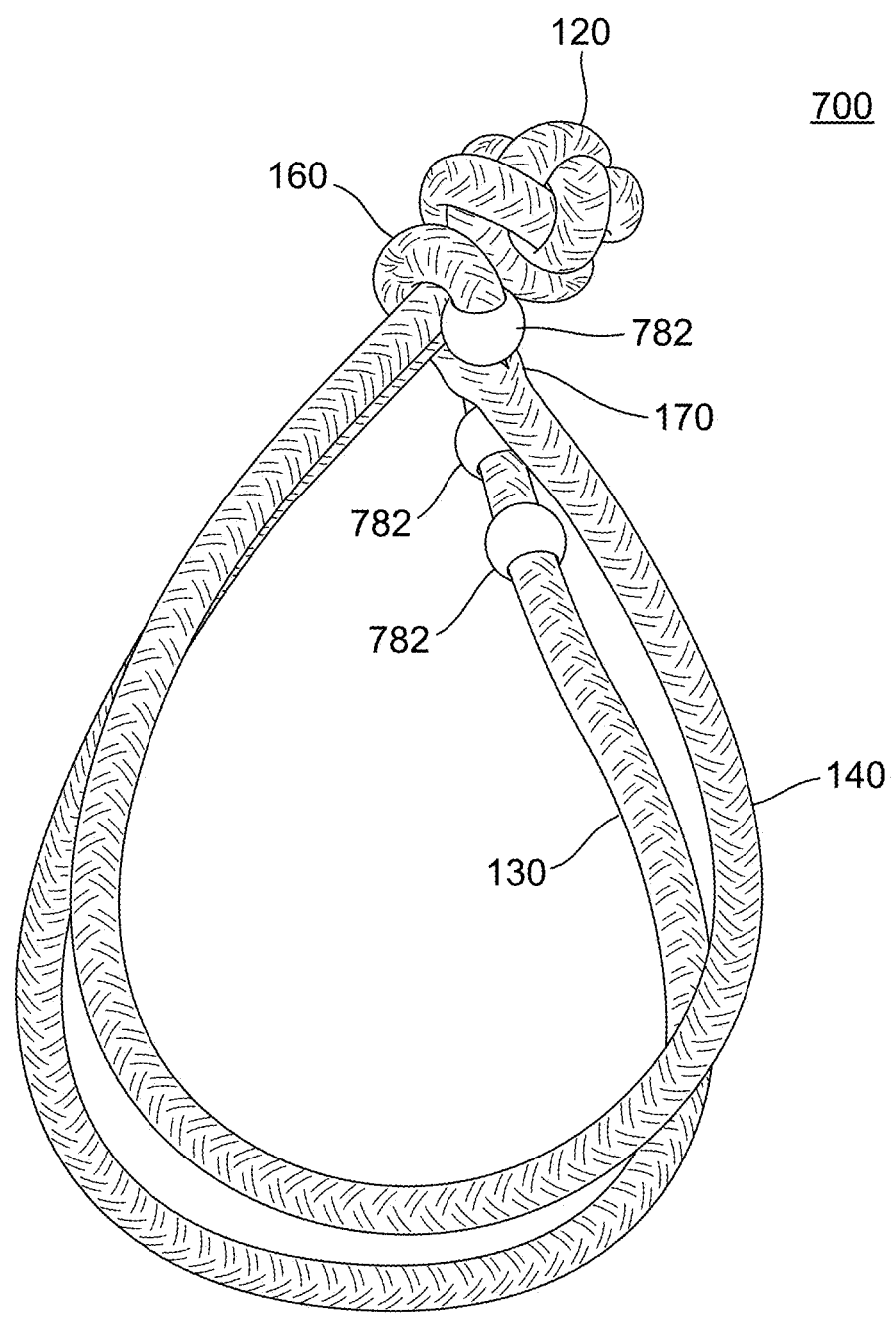
FIG. 7 illustrates a soft shackle in accordance with another exemplary embodiment.

As shown in FIG. 5, the locking mechanism is a pin 580 inserted through the moving leg 130 of the soft shackle 500 to establish a surface that cannot pass through the non-moving leg 140 at the junction 170 to prevent the loop 160 from opening. Alternatively, the pin 580 may be inserted through both the moving and non-moving legs 130, 140 of the soft shackle 500 behind the adjustable diameter loop 160 to secure the legs together so that one cannot easily move relative to the other, maintaining loop size until the pin 580 is removed. It will be appreciated that any pin through the moving leg, or securing the legs together, is preferably removable, not permanent, so that the loop can be intentionally manipulated when desired to open or close the shackle eye and secure the shackle to a load. Turning to FIG. 7, in order to further resist backward movement of the moving leg 130, a soft shackle 700 may include one or more inserts, such as a series of beads 782, smaller knots, etc., positioned on and/or within the core of the moving leg 130.

Figure 3A:
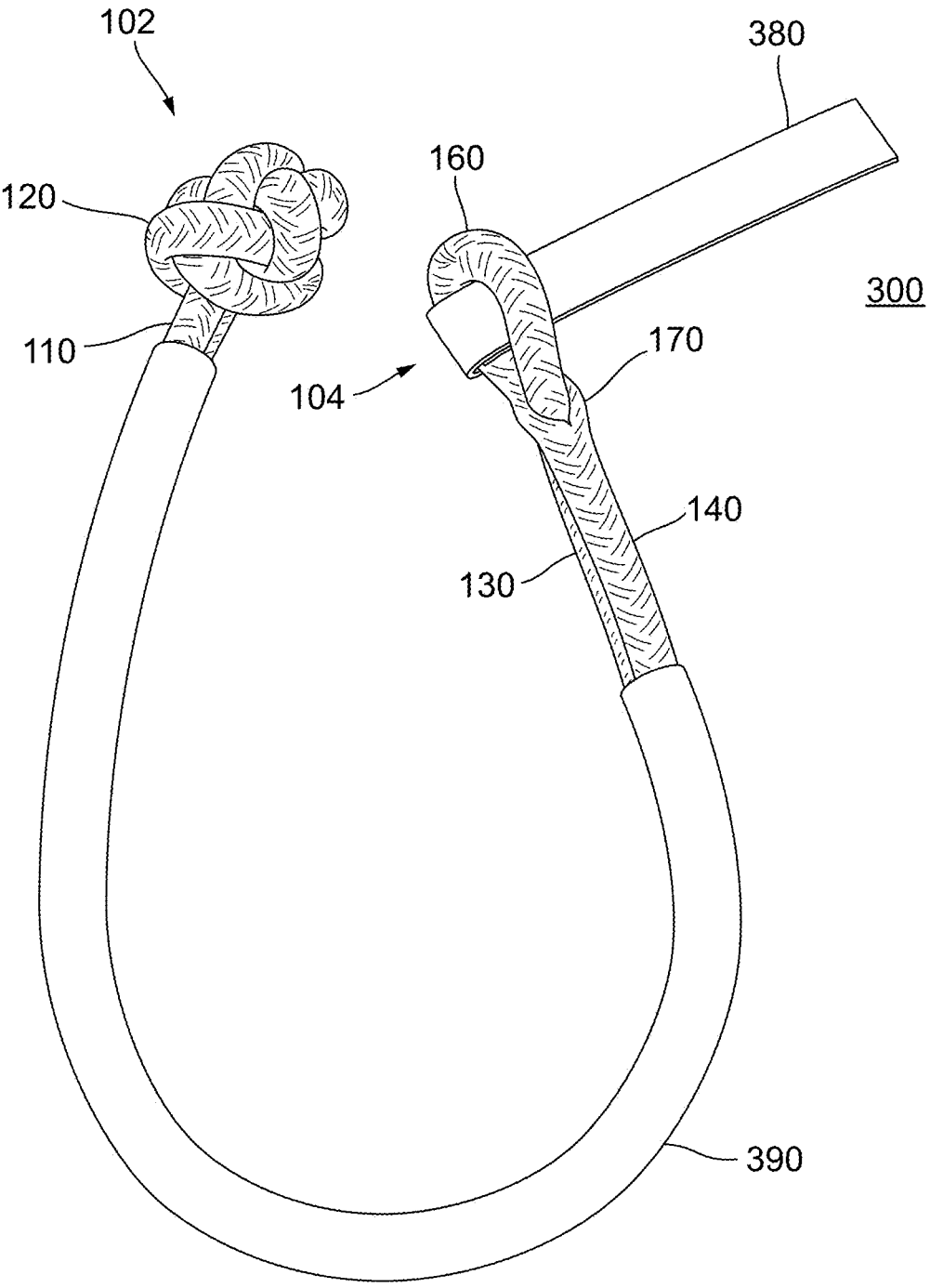
FIG. 3A illustrates a soft shackle in accordance with still another exemplary embodiment in an open link configuration.
Figure 3B:
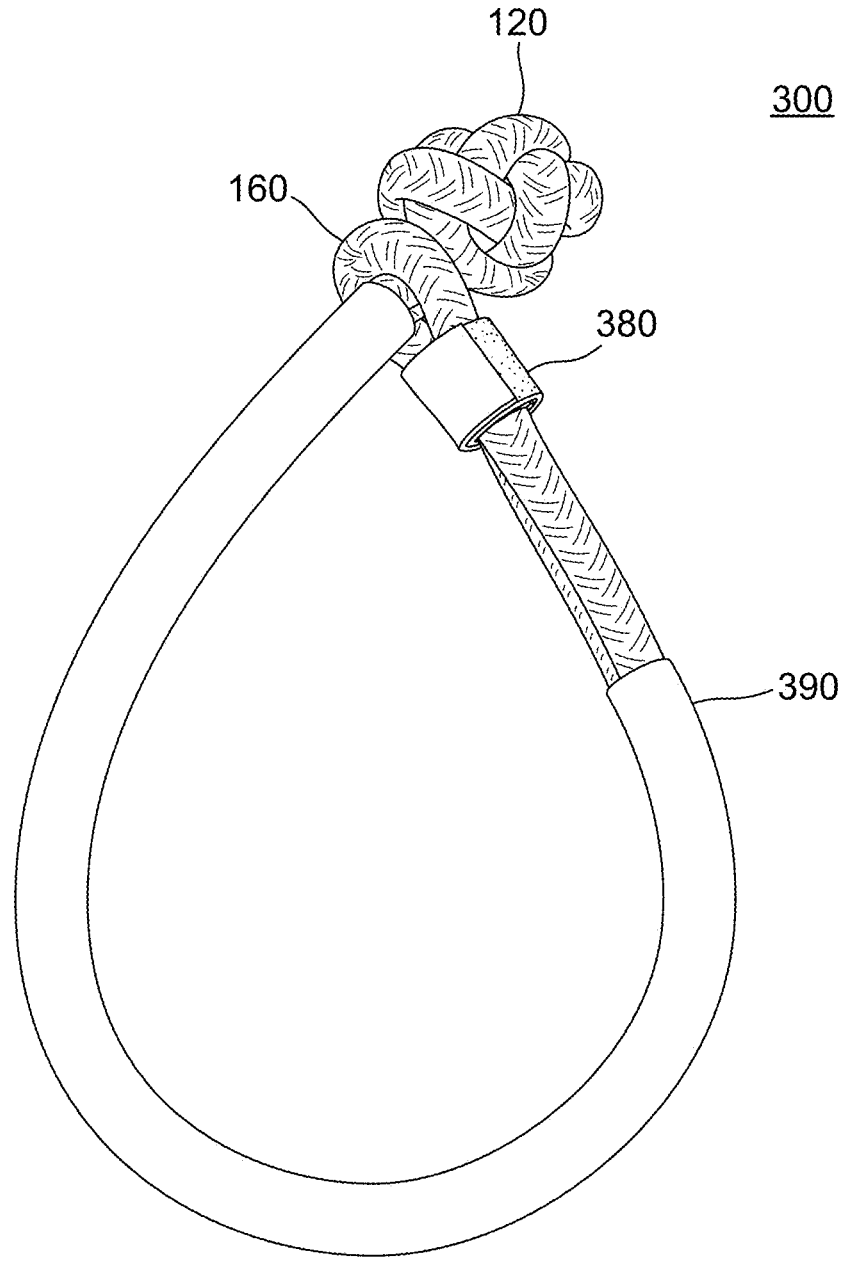
FIG. 3B illustrates the soft shackle of FIG. 3A in a closed link configuration.
Figure 3C:
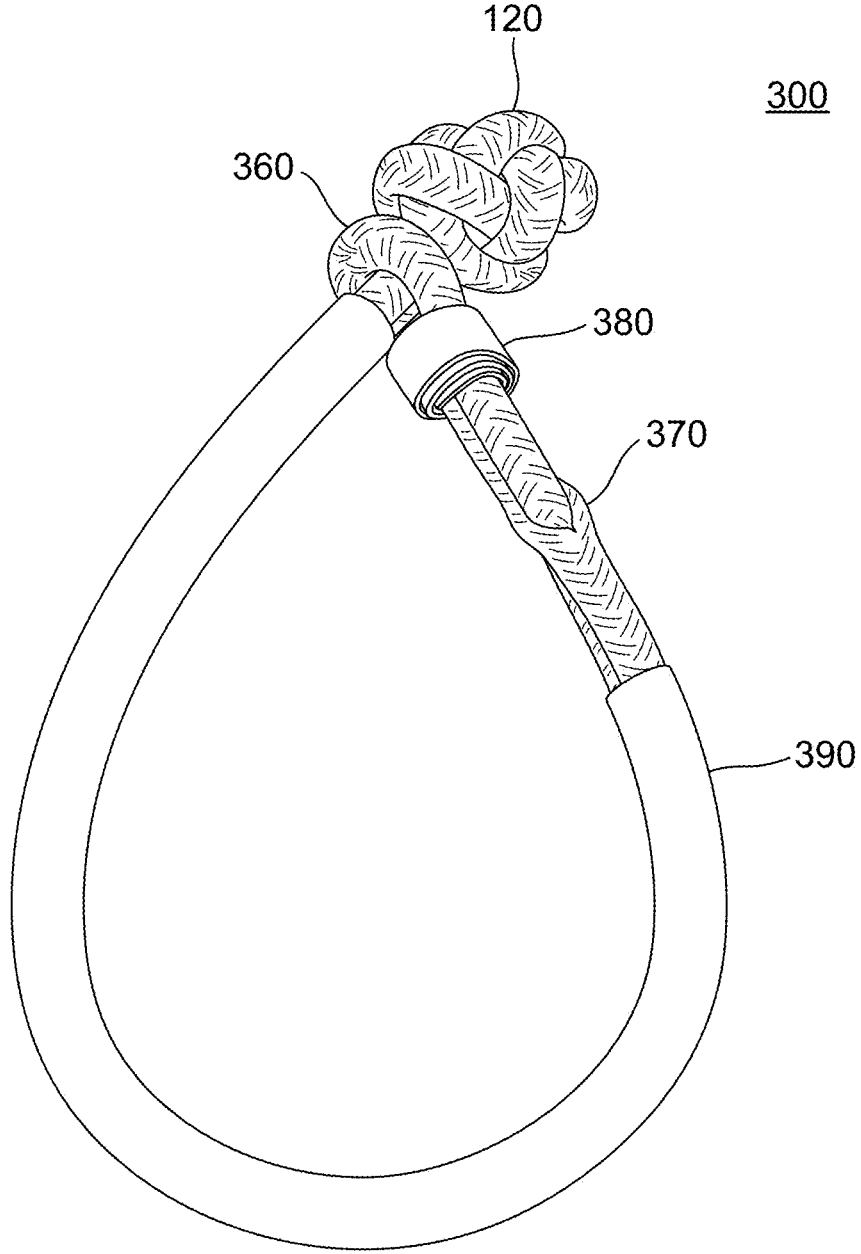
FIG. 3C illustrates an alternative version of the soft shackle of FIG. 3B.

FIGS. 3A through 3C show an illustrative embodiment in which the locking mechanism is attached to the adjustable loop for use in securing opposite sides of the loop to one another. The closure can be a hardware device or soft goods, such as lashing that is wrapped about the loop after the soft shackle has been installed. Lashing or other closures may be permanently affixed in place following the adjustable loop being cinched into the desired position adjacent the knot.

Alternatively, as illustrated, the locking mechanism is a web 380 employing a hook and eye fastener system that remains attached but is removable from its locking position.

In FIG. 3A, the soft shackle 300 is shown as an open rope link with the knot 120 at the first end 102 and the adjustable diameter loop 160 at the opposite end 104. The web 380 for the locking mechanism is constrained within the loop 160; as illustrated, one end of the web 380 is wrapped around the circumference of the base rope 110 inside the loop 160 and attached back to itself while the other end of the web 380 is free.

FIG. 3B illustrates the soft shackle 300 in the shackle conformation. As previously described with respect to other embodiments, after the loop 160 has been opened by manipulating the moving leg 130 through the loop junction 170 to be large enough to fit over the knot 120, the moving leg 130 is moved in the opposite direction back through the loop junction 170 to cinch the loop 160 in place adjacent the knot 120. FIG. 3B also illustrates how the web 380 is lashed around the opposite sides of the loop 160 and/or the loop junction 170. The web 380 may be secured in place using, for example, a hook and loop fastener with hooks on one side of the web and loops on the other. In some embodiments, the width of the web is sized to cover the entirety of the loop junction 170 and/or any gap between the loop 160 and any protective coating.

The alternative embodiment of FIG. 3C shows how a loop 360 may be used in conjunction with a locking mechanism provided by the web 380 to secure together a portion of the opposing sides of the loop 360. This may be useful, for example, in embodiments in which the loop 360 is of a fixed diameter. A fixed diameter loop may include providing a permanently fixed loop junction 370 in which the legs are fixed at the junction so as to not be movable with respect to one another via, e.g., an epoxy or hardware device.

In some embodiments, abrasion protection may be applied over the legs 130, 140. As shown in FIGS. 3A and 3B, chafe 390 extends from the knot 120 over a majority of the distance to the loop junction 170 and in some preferred embodiments may approach up to an entire or nearly entire length to the loop junction 170 so that when the web 380 is wrapped about the sides of the loop 160 and/or loop junction 170, the web 380 covers the entire gap not already covered by the chafe 390. Other kinds of abrasion protection may also be employed such as, for example, a polyurethane or other kinds of coating.

Although described herein with respect to certain illustrated features shown and described in certain figures, it will be appreciated that various locking mechanisms may be used in combination with one another in any suitable combination as desired. For example, one pin could be used in the stopping knot as a primary locking mechanism (e.g., FIG. 4) and a second pin or other hardware device used to secure the relative position of the legs (e.g., FIG. 5) as a secondary locking mechanism, or vice versa. Or a web constrained in the loop to lash opposing sides of the loop (e.g., FIG. 3B) could be used as a primary locking mechanism in conjunction with a hardware element situated adjacent the knot (e.g., FIG. 1), as a secondary locking mechanism.

Figure 8:
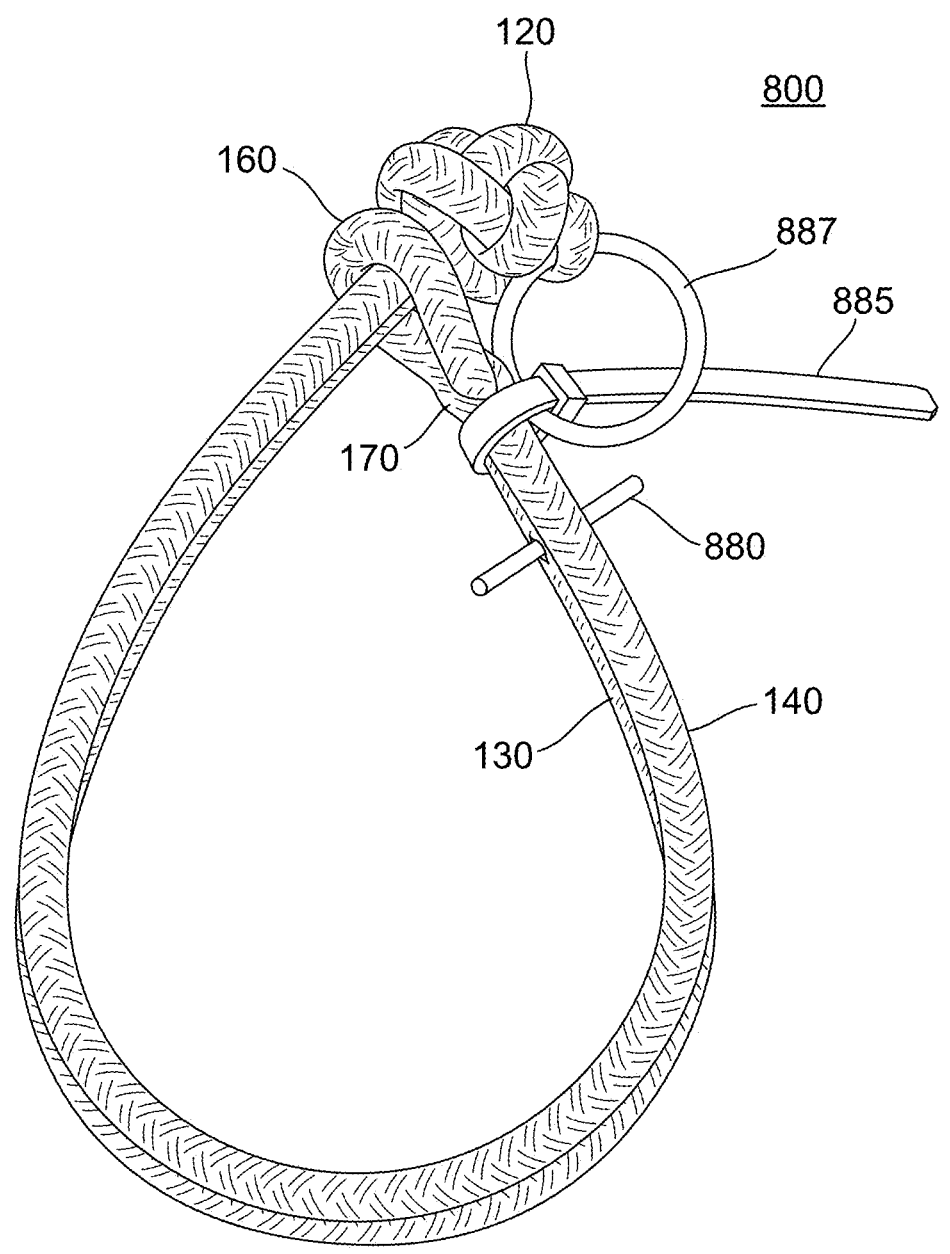
FIG. 8 illustrates a soft shackle in accordance with another exemplary embodiment.

Other forms of secondary locking mechanisms may also be used. Turning to FIG. 8, a soft shackle 800 having a locking mechanism to define a maximum size of the adjustable loop 160 as previously described, such as lashing or pin 880, also includes a locking loop 887 incorporated into the knot 120. Once the soft shackle has been secured with the primary locking mechanism, a secondary cinch 885 can be inserted through the locking loop 887 and around one or both legs at the second end 104 of the shackle 800 so that when the secondary cinch 885 is closed, the knot 120 and adjustable loop 160 are held in a fixed relationship even in the absence of tension on the adjustable loop. The secondary cinch 885 may be any suitable hardware device, such as a caterpillar clamp or zip tie, the secondary cinch 885 being primarily operative to prevent relative movement of the shackle components, not support any of the load borne by the soft shackle 800.

Although the locking loop 887 is shown in FIG. 8 being incorporated into the knot 120, it will be appreciated that the locking loop can be incorporated at other points along the length of the soft shackle 800.

Figure 9A:
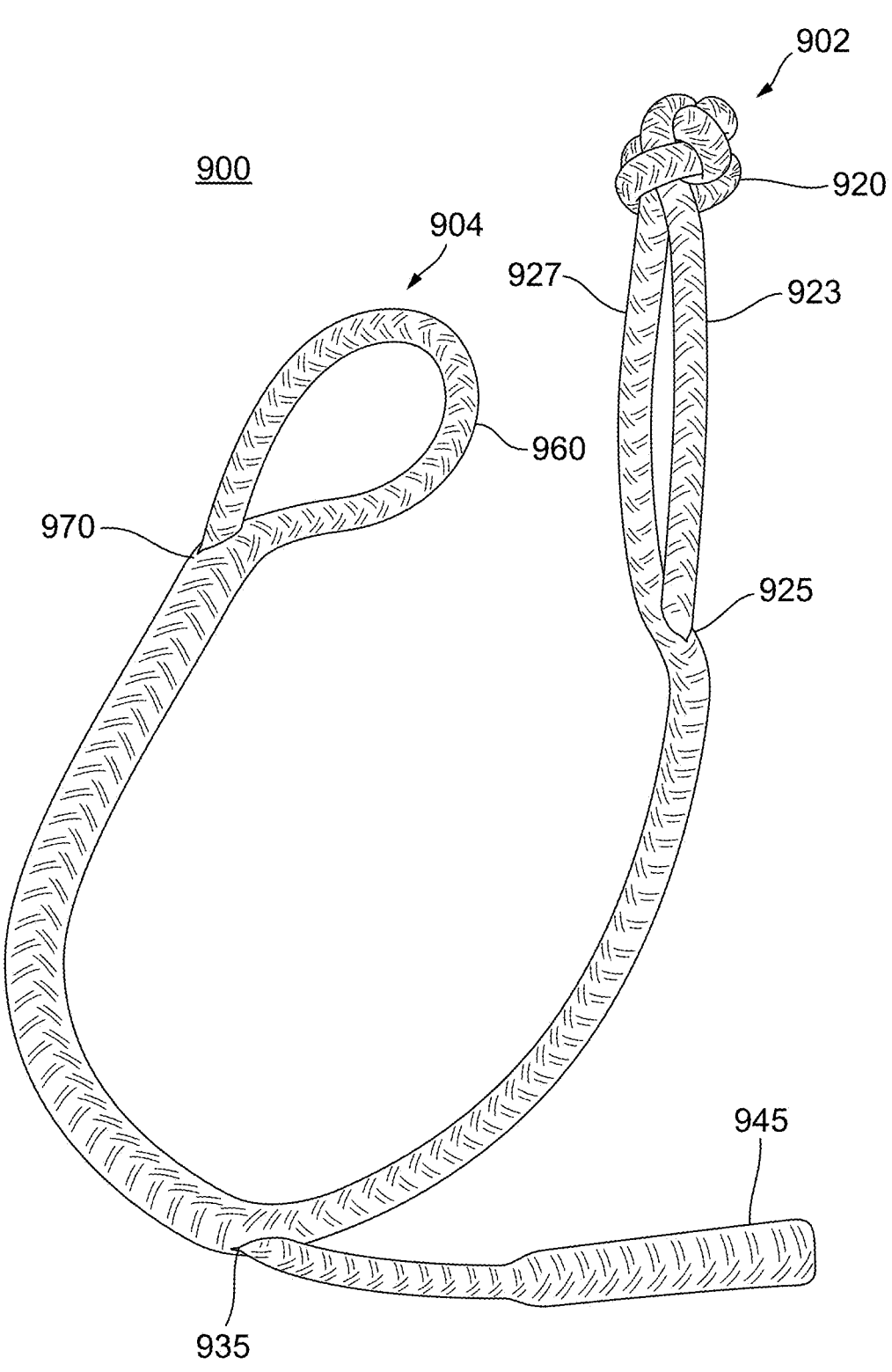
FIGS. 9A through 9C illustrate one open, and two closed, soft shackle configurations in accordance with another embodiment.
Figure 9B:
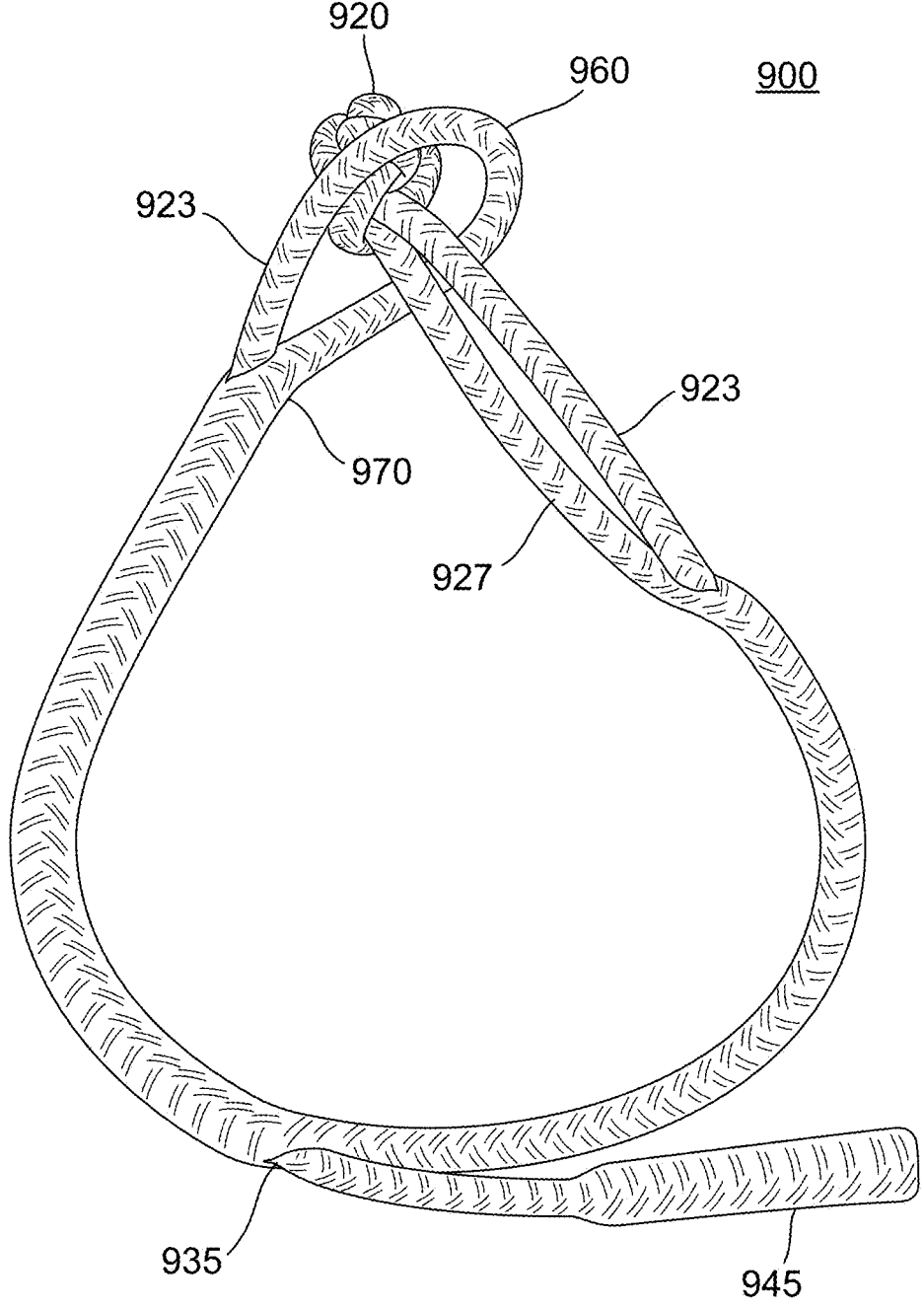
Figure 9C:
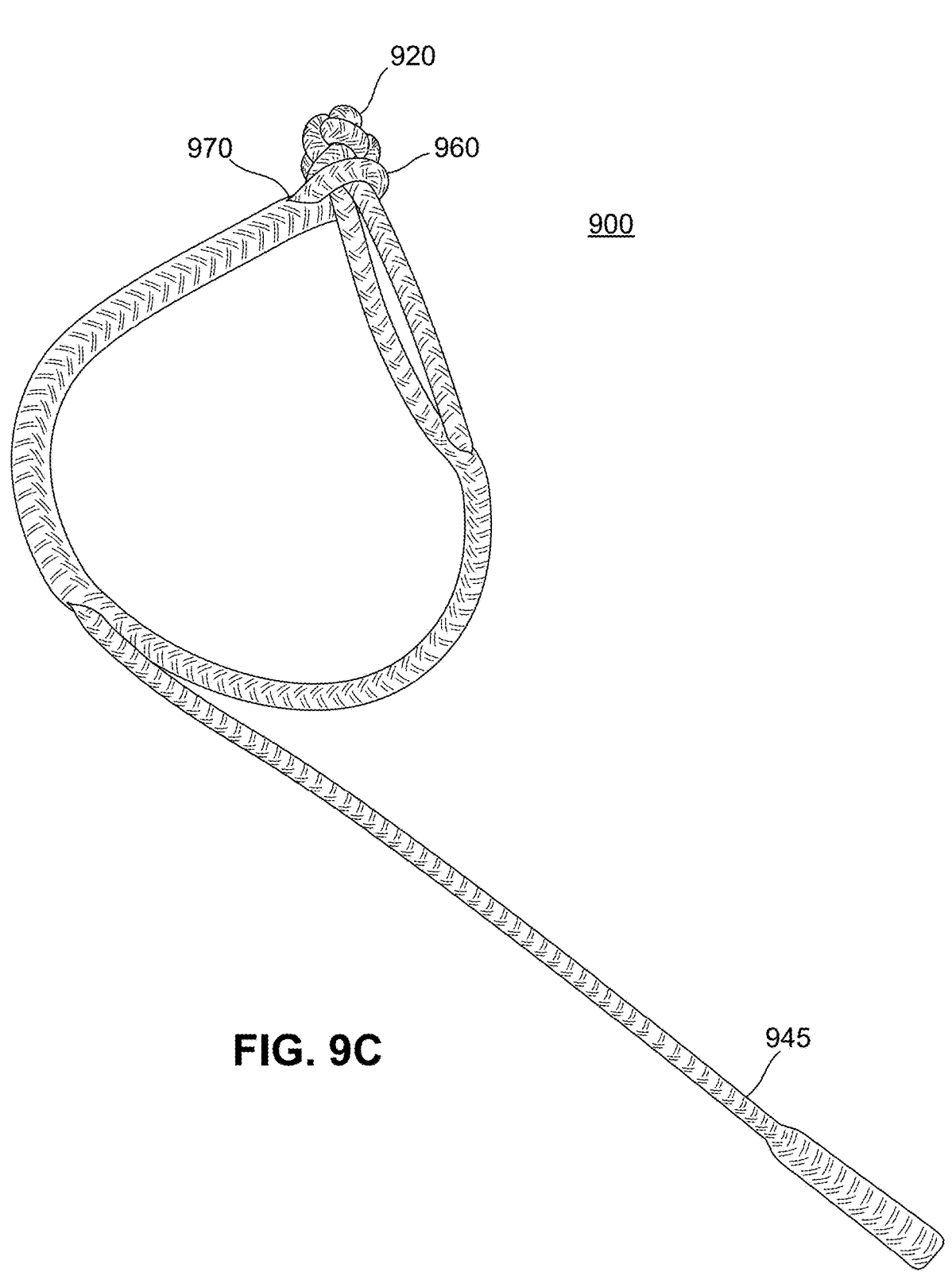

FIGS. 9A through 9C illustrate a soft shackle 900 having a Whoopie sling style or Brummel splice conformation. FIG. 9A shows the soft shackle in its open configuration. At the first end 902 with the knot, the soft shackle 900 is provided with a button knot 920 formed at the end of primary legs 923, 927 of the base rope. Any ends of the legs extending beyond the knot 920 may be cut at the knot or each of those legs extending beyond the knot may be buried back coaxially within the two primary legs 923, 927. The two primary legs 923, 927 cross one another to form a Brummel splice 925, with one of the primary legs 927 buried coaxially into the other primary leg 923 for a predetermined distance and then terminated. The remaining primary leg 923 forms an adjustable loop 960 at the opposite end 904 of the open soft shackle from the knot 920, then passes back through itself until it exits at a point 935 some predetermined distance along the shackle's length back toward the knot. A back splice may be formed to create a handle 945 at the end of the primary leg 923 following its exit.

Turning to FIG. 9B, the primary leg 923 forming the adjustable loop 960 can be manipulated, such as by milking, to expand the adjustable loop large enough to fit over the knot 920, forming the shackle eye. Thereafter, the handle 945 can be pulled and/or the adjustable loop 960 can be manipulated, such as again by milking, to cinch the adjustable loop 960 in place adjacent the knot, as seen in FIG. 9C. The friction force of the primary leg 923 passing back through itself at the loop junction 970 creates a locking mechanism that retards the ability of the adjustable diameter loop to open in the absence of an intentionally applied loop opening force.

These features may be advantageous in combination with either of an advanced splice as described with respect to FIGS. 9A-C or with a simple pass-through splice as described with respect to the other figures.

Figure 10:
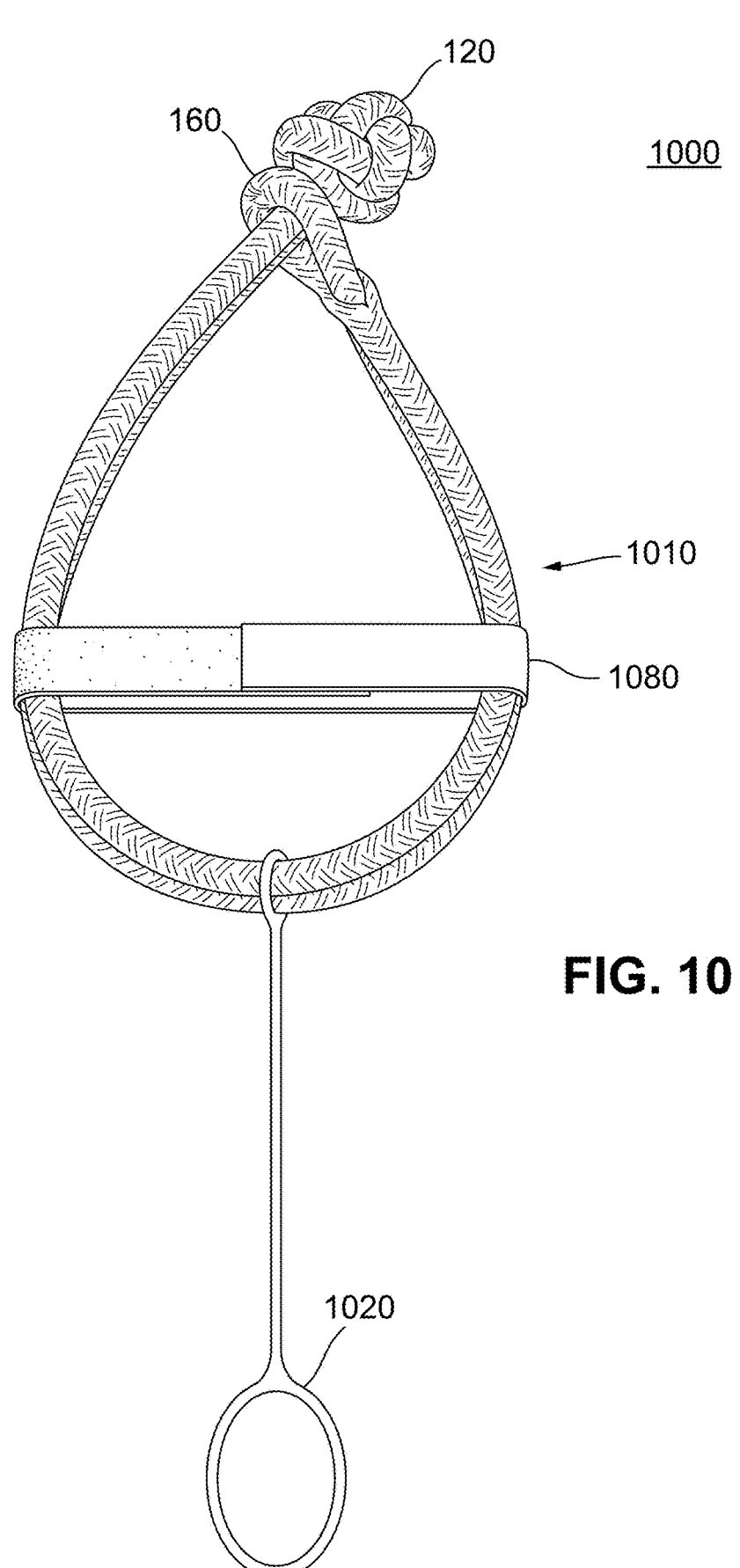
FIG. 10 illustrates a sling incorporating a soft shackle in accordance with another exemplary embodiment.

FIG. 10 illustrates another embodiment in which a soft shackle having one or more locking mechanisms as contemplated herein can be further integrated into a more extensive rope system instead of being provided as a discrete component. A soft shackle 1010 is constructed at one end of a rope system 1000 formed as a sling, in which an eye splice creates a fixed diameter loop 1020 at the opposite end of the rope system 1000. It will be appreciated that this conformation is exemplary and other conformations may also be employed, including, for example, two soft shackles 1010 formed at opposing ends of the rope. As further shown in FIG. 10, a simple closure 1080 may be used to prevent the loop 160 moving laterally away from the knot 120 when the soft shackle 1010 is closed and tensioned by holding the legs on either side of the shackle eye in position relative to one another. The closure 1080 can be, for example, a hook and eye fastener (e.g. Velcro) or similar closable loop.

8

Figure 11:
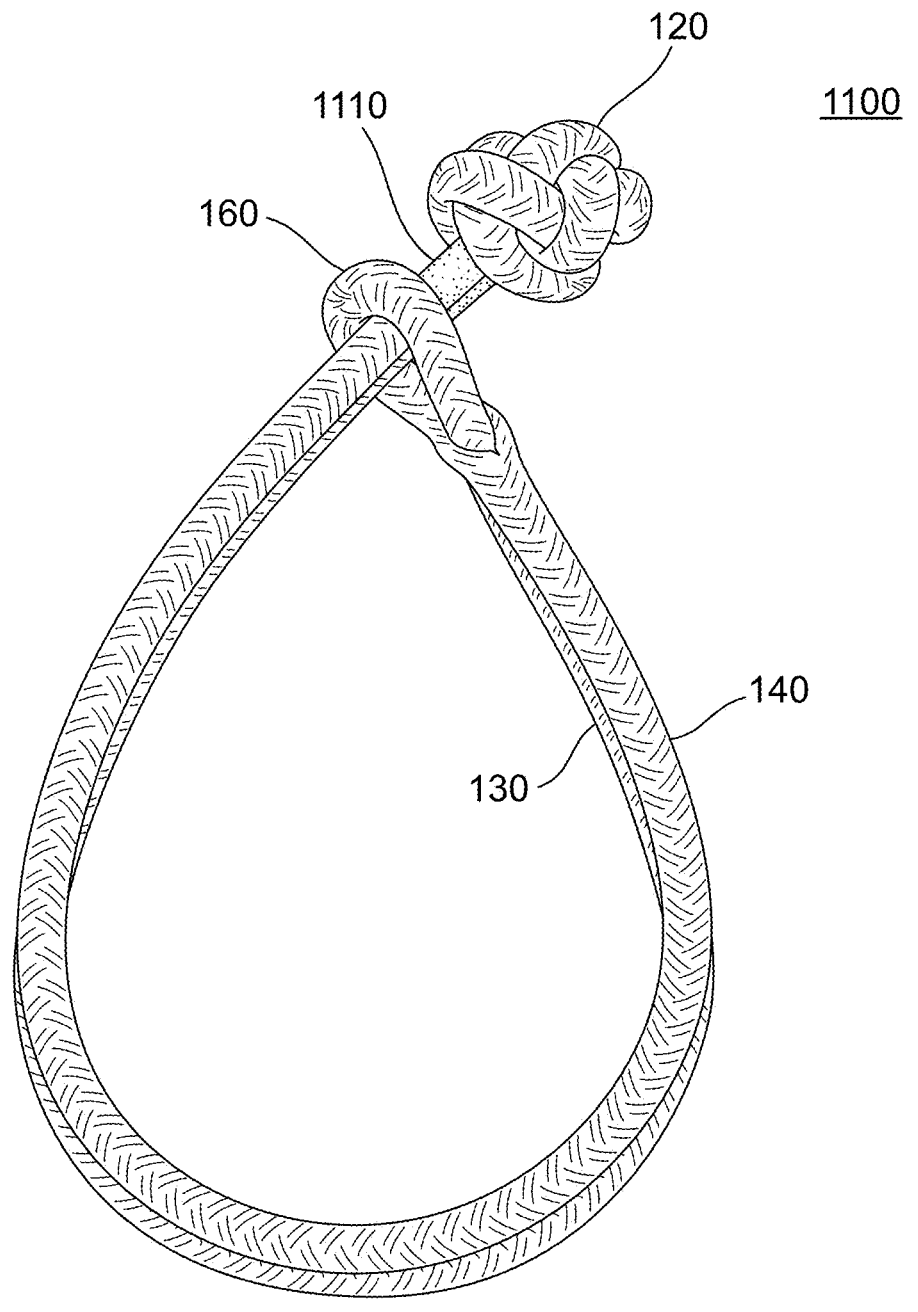
FIG. 11 illustrates a soft shackle having a visual indicator in accordance with exemplary embodiments.
Figure 12:
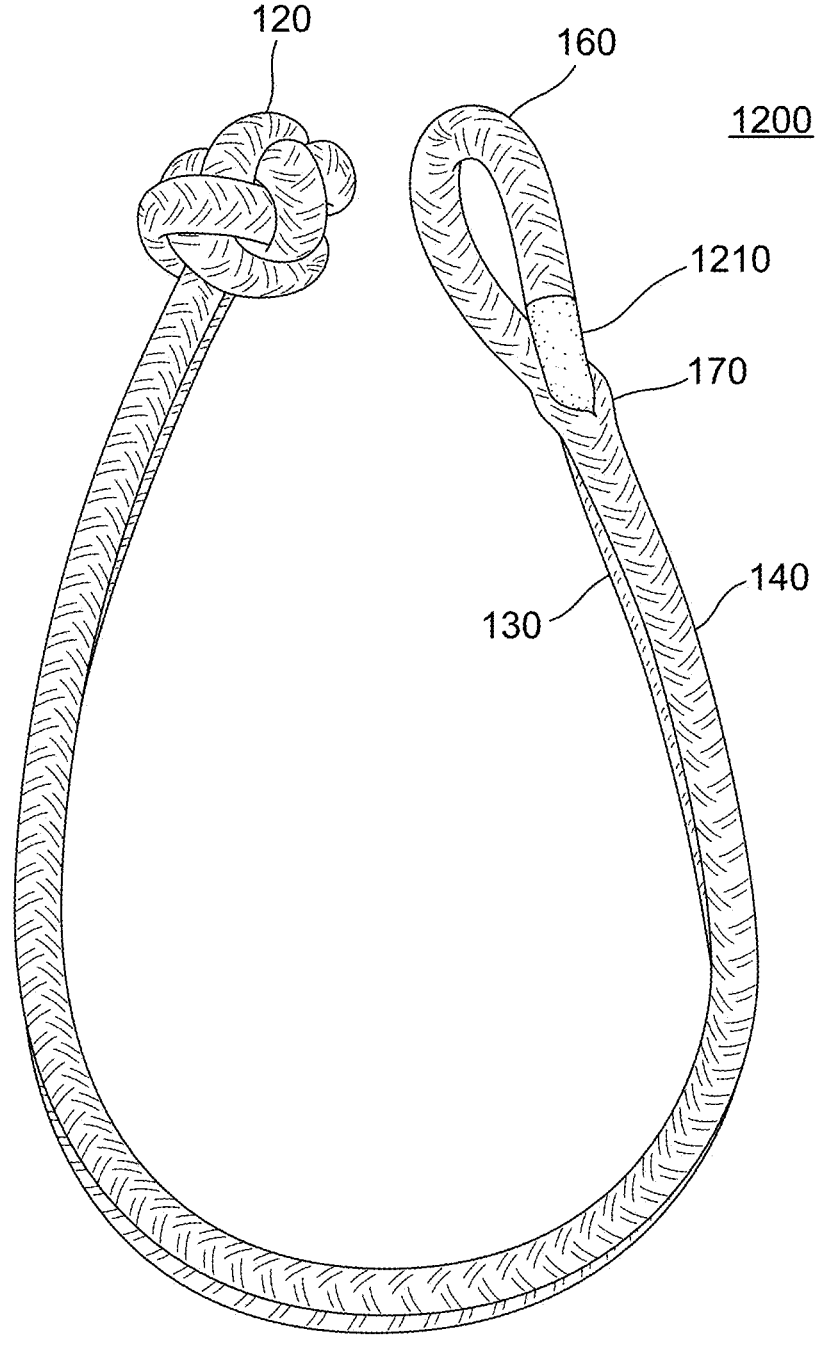
FIG. 12 illustrates another exemplary embodiment of a soft shackle having a visual indicator.

Referring now to FIGS. 11 and 12, exemplary embodiments provide indicators that may be used alone or in combination with one or more locking mechanisms to provide a visual cue if slack in a soft shackle has resulted in unintended movement of the moving leg to expand the adjustable loop size and/or resulting in partial movement of the adjustable loop over the stopping knot, as well as to confirm proper assembly of the soft shackle when initially secured. The use of an indicator can identify a potential impending failure of the shackle before it happens, providing time for intervention that can prevent the ultimate loss of load. The indicator may be a string, tag or other tell-tale affixed to a location along the non-moving leg in a stowed position so that it is fully exposed only if the moving leg travels enough for it to be freed from its stowed position.

In FIG. 11, a soft shackle 1100 includes a region of contrasting color 1110 located on the base rope 110 at a desired operational region for the adjustable loop 160 positioned adjacent the knot 120 in the closed shackle conformation. In normal operation, when the adjustable loop 160 is under tension and cinched tight at the desired location for use, the contrasting color or other indicia is hidden from view by the adjustable loop 160. If tension is lost and the adjustable loop 160 backs open and subsequently begins to slip, the region of contrasting color 1110 becomes visible and alerts a user to a potential for impending failure. Additionally, the indicia may also serve as an affirmative indication that the adjustable loop 160 has been properly installed and cinched at the intended location such that the indicia is not visible as a result of being covered by the adjustable loop 160.

In FIG. 12, a soft shackle 1200 has a region of contrasting color 1210 located on the moving leg 130 at a desired operational position with respect to the loop junction 170. If the moving leg 130 has shifted relative to the non-moving leg during use and the adjustable loop 160 has changed size, the region of contrasting color 1210 on the moving leg 130 that is normally hidden by the loop junction 170 becomes visible and similarly alerts a user to a potential for impending failure.

It will be appreciated that multiple visual indicators may be used in combination, such as, for example, both of the visual indicators shown in FIGS. 11 and 12.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention but that the invention will include all embodiments falling within the scope of the appended claims. In addition, all numerical values identified in the detailed description shall be interpreted as though the precise and approximate values are both expressly identified.

What is claimed is:
1. A soft shackle rope link comprising:
a first end comprising a knot and having first and second rope legs extending therefrom toward a second end opposite the first end, the second end having a loop defined by the first rope leg passing through the second rope leg at a loop junction, the first and second rope legs being part of a same base rope, wherein the rope link is configured to have a shackle
conformation defining a shackle eye when the knot is
positioned through the loop and the loop is positioned
adjacent a second end side of the knot;
and further comprising a locking mechanism permanently
attached to the rope link, the locking mechanism estab-
lishing a maximum diameter of the loop that is less than
a diameter of the knot;
wherein the locking mechanism includes a web secured
to, and extending from, the loop, the web configured to
wrap around and secure relative movement of the first
leg with respect to the second leg.

2. The soft shackle rope link of claim 1, wherein the loop
is an adjustable diameter loop and the first rope leg is
movable with respect to the second rope leg to adjust the
diameter of the adjustable diameter loop.

3. The soft shackle rope link of claim 1, wherein the web
is wrapped around at least a portion of the loop junction in
the shackle conformation.

4. The soft shackle rope link of claim 3, wherein the web
is further wrapped around the first and second legs imme-
diately adjacent the loop junction in the shackle conforma-
tion.

5. The soft shackle rope link of claim 1 further comprising
a chafe overlying a portion of the first and second rope legs.

6. The soft shackle rope link of claim 1, wherein the soft
shackle rope link consists of a single base rope.

7. The soft shackle rope link of claim 2 further comprising
a handle to adjust the diameter of the adjustable diameter
loop.

8. The soft shackle rope link of claim 1 further comprising
a surface including indicia applied to the base rope at a
location configured to convey information of a potential
failure of the soft shackle rope link.

9. The soft shackle rope link of claim 8, wherein the
indicia is applied at a predetermined location adjacent the
knot so as to be covered by the loop when the soft shackle
rope link is in its shackle conformation.

10. The soft shackle rope link of claim 8, wherein the
indicia is applied at a predetermined location of the moving
leg so as to be covered by the loop junction when the soft
shackle rope link is in its shackle conformation.

11. The soft shackle rope link of claim 1 further compris-
ing a second locking mechanism, the second locking mecha-
nism having an element attached adjacent to, or integral
with, the knot, and defining a removal diameter for the loop
that is at least 3.1 times greater than a diameter of the base
rope.

12. A rope system comprising the soft shackle rope link of
claim 1 spliced with a second rope.

13. A soft shackle rope link comprising:
a first end comprising a knot and having first and second
rope legs extending therefrom toward a second end
opposite the first end, the second end having an adjust-
able diameter loop defined by the first rope leg passing
through the second rope leg at a loop junction, the first
and second rope legs being part of a same base rope,
wherein the first rope leg is movable with respect to the
second rope leg to adjust the diameter of the adjustable
diameter loop,
wherein the rope link is configured to have a shackle
conformation defining a shackle eye when the knot is
positioned through the adjustable diameter loop and the
loop is positioned adjacent a second end side of the
knot;
a locking mechanism to establish a maximum diameter of
the adjustable diameter loop that is less than a diameter
of the knot, the locking mechanism comprising a web
permanently affixed to and extending from the adjust-
able diameter loop and, in the shackle conformation, is
wrapped around at least a portion of the loop junction
to releasably secure relative movement of the first leg
with respect to the second leg; and
the rope link further comprising a chafe covering at least
a portion of the first and second legs extending from the
first end adjacent the knot to a predetermined location
proximate the loop junction,
wherein, in the shackle conformation, the web is further
wrapped to cover exposed portions of the first and
second legs intermediate the loop junction and an end
of the chafe proximate the loop junction.

* * * * *